United States Patent
Aakre

(10) Patent No.: US 7,819,196 B2
(45) Date of Patent: Oct. 26, 2010

(54) METHOD FOR OPERATING ACTUATOR AND AN ACTUATOR DEVICE FOR USE IN DRAINAGE PIPE USED FOR PRODUCING OIL AND/OR GAS

(75) Inventor: Haavard Aakre, Skien (NO)

(73) Assignee: Norsk Hydro ASA, Oslo (NO)

( * ) Notice: Subject to any disclaimer, the term of this patent is extended or adjusted under 35 U.S.C. 154(b) by 609 days.

(21) Appl. No.: 10/588,777

(22) PCT Filed: Feb. 11, 2005

(86) PCT No.: PCT/NO2005/000049
§ 371 (c)(1), (2), (4) Date: Feb. 27, 2007

(87) PCT Pub. No.: WO2005/080750
PCT Pub. Date: Sep. 1, 2005

(65) Prior Publication Data
US 2007/0256840 A1    Nov. 8, 2007

(51) Int. Cl.
*E21B 34/08* (2006.01)
*E21B 43/12* (2006.01)

(52) U.S. Cl. .................. 166/369; 166/373; 166/320

(58) Field of Classification Search ............ 166/50, 166/313, 319, 320, 373; 137/67, 68.11, 78.3, 137/455; 251/12, 14
See application file for complete search history.

(56) References Cited

U.S. PATENT DOCUMENTS 6,069,118 A * 5/2000 Hinkel et al. ............... 507/277
6,313,545 B1  11/2001 Finley et al.

FOREIGN PATENT DOCUMENTS

| DE | 3121968 | 12/1982 |
| EP | 0 588 421 | 11/1999 |
| EP | 1 050 338 | 7/2003 |
| SU | 969958 A | * 10/1982 |
| WO | 98/11979 | 3/1998 |
| WO | 02/075110 | 9/2002 |

OTHER PUBLICATIONS

Chinese Office Action (in English language) issued Feb. 12, 2010 in corresponding Chinese Patent Application No. 200580005450.9.

* cited by examiner

*Primary Examiner*—Shane Bomar
*Assistant Examiner*—Robert E Fuller
(74) *Attorney, Agent, or Firm*—Wenderoth, Lind & Ponack, L.L.P.

(57) ABSTRACT

A method and a device in connection with an actuator intended for use in connection with a fluid flow or fluid reservoir, in particular an actuator that is designed to be used in connection with a drainage pipe (8) for the production of oil and/or gas in an oil and/or gas reservoir. An osmotic cell (9) is used to operate the actuator (10). The osmotic cell is placed in the fluid flow, whereby the necessary force and motion for the actuator (10) to adjust or drive a fluid control device or valve are achieved by utilizing the osmotic pressure difference between the solution in the cell (9) and an external fluid flow/reservoir in relation to the cell.

13 Claims, 2 Drawing Sheets

or inflow control device are achieved by utilizing the osmotic pressure difference between the solution in the cell and the external fluid flow or fluid reservoir in relation to the cell.

METHOD FOR OPERATING ACTUATOR AND AN ACTUATOR DEVICE FOR USE IN DRAINAGE PIPE USED FOR PRODUCING OIL AND/OR GAS

BACKGROUND OF THE INVENTION

1. Technical Field

The present invention relates to a method for operating an actuator and an actuator device, in particular a pressure actuator that is designed to be used in connection with drainage pipes for production of oil and/or gas in an oil and/or gas reservoir.

2. Description of the Related Art

Drainage pipes of the above type are normally divided into a number of sections with one or more inflow restriction devices that regulate the inflow to the drainage pipe.

U.S. Pat. Nos. 4,821,801, 4,858,691 and 4,577,691 and GB patent no. 2169018 describe prior art devices for the extraction of oil or gas in long horizontal and vertical wells. These prior art devices comprise a perforated drainage pipe with, for example, a filter for sand control around the pipe. A major disadvantage of the prior art devices in connection with oil and/or gas production in highly permeable geological formations is that the pressure in the drainage pipe increases exponentially in the upstream direction as a consequence of flow friction in the pipe. As the pressure difference between the reservoir and the drainage pipe decreases upstream as a consequence of this, the inflow quantity of oil and/or gas from the reservoir to the drainage pipe will also decrease accordingly. The total oil and/or gas production will therefore be low with such a solution. For thin oil zones and high permeability in the geological formation, there is a high risk of coning, i.e. inflow of undesired water or gas into the drainage pipe downstream, where the speed of the oil flow from the reservoir to the pipe is greatest. To avoid such coning, production must therefore be reduced further.

Somewhat higher production than with the above prior art solutions is achieved using the Stinger method, which is discussed in Norwegian patent application no. 902544. This method consists of two drainage pipes, of which an outer one is perforated, and an inner pipe (Stinger), which does not include perforations, extends into the outer pipe to a desired position. The pressure profile and thus the productivity of the Stinger method is somewhat better than for other prior art methods. In thin oil zones with high permeability, however, coning of undesired water or gas may also occur with this method with reduced productivity as a result.

World Oil, vol. 212, N. 11 (11/91), pages 23-78, describes a method of dividing a drainage pipe into sections with one or more inflow restriction devices in the form of displaceable sleeves or throttle devices. However, this publication is mainly concerned with inflow control to restrict inflow from zones upstream in the pipe to prevent water and gas coning.

WO-A-9208875 shows a horizontal production pipe comprising a number of production zones, each of which is connected to mixing chambers that have a greater internal diameter than the production zones. The production zones comprise an external perforated pipe, which may be regarded as a filter. However, the sequence of sections that have different diameters is unfortunate as they create flow turbulence through the pipe and prevent the use of equipment that is normally introduced by means of downhole tractors or "coiled tubing" systems.

The technology for drilling horizontal wells was known back in 1920, but many today still regard it as pioneering technology. In the last twenty years, development work has taken place that allows horizontal wells to be drilled in a safe, effective manner. The current status of technology is that drilling safety is high, and the costs are approximately 50% higher than for vertical wells, but horizontal wells produce three to four times the quantity, depending on the characteristics of the reservoir.

The actuator in accordance with the present invention is further characterized in that the actuator comprises an osmotic cell that is designed to be placed in the fluid flow, whereby the necessary force and motion for the actuator to drive or adjust a valve or inflow control device are achieved by utilizing the osmotic pressure difference between the solution in the cell and the external fluid flow or fluid reservoir in relation to the cell.

BRIEF DESCRIPTION OF THE DRAWINGS

The present invention will be described in the following in further detail with reference to the attached drawings, where.

DETAILED DESCRIPTION OF THE INVENTION

The present invention is based on the principle of utilizing the osmotic pressure difference in a cell as the "drive mechanism" or drive unit for an actuator. More precisely, the present invention is based on an osmotic cell being used to operate the actuator. The osmotic cell is placed in the fluid flow, whereby the necessary force and motion for the actuator to drive or adjust for instance a valve or inflow control device are achieved by utilizing the osmotic pressure difference between the solution in the cell and the external fluid flow in relation to the cell.

Figure 1:
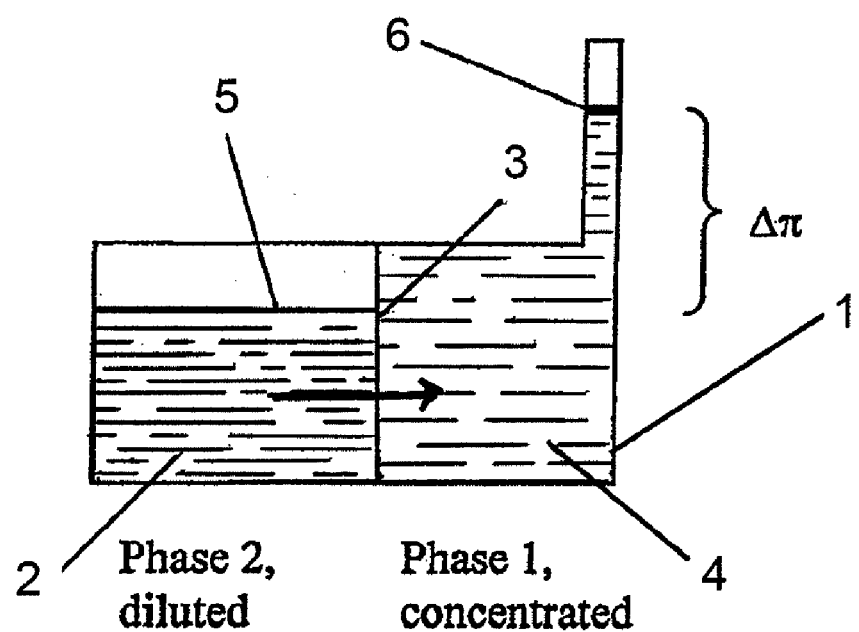
FIG. 1 shows a schematic diagram of a membrane cell that separates two solutions and that indicates the principle of the present invention.

The fundamental method of operation of a cell in accordance with the present invention can be illustrated as shown in FIG. 1 with a "closed" container 1 with two chambers 2, 4, in which one of the walls consists of a semi-permeable membrane 3. The semi-permeable membrane 3 is permeable in relation to the solution, expediently a water/salt solution, located in one chamber 2, but impermeable in relation to the dissolved medium, expediently a salt medium. The water can thus move freely from chamber 2 in the cell, past the membrane 3 to the water or a water solution with a lower salt level in the other chamber 4. The transportation of water past the membrane will cause a pressure difference across the membrane. This is called the osmotic pressure difference. The thick line in each of the chambers 5, 6 indicates the liquid levels in them.

The osmotic pressure can be defined by means of classic thermodynamic equations in which equilibrium across the membrane is assumed. The chemical potential of the solution will be the same on each side of the membrane when equilibrium is achieved, assuming isothermal conditions. With reference to FIG. 1, the chemical potential for the two phases in chambers 2 and 4 respectively will be given by:

$$\mu_{i,1} = \mu_{i,1}^\circ + RT \ln a_{i,1} + V_i P_1 \qquad (1)$$

$$\mu_{i,2} = \mu_{i,2}^\circ + RT \ln a_{i,2} + V_i P_2 \qquad (2)$$

where R is the universal gas constant, T is the temperature, V is the molar volume, P is the pressure and a is the concentration of the solution. The solution molecules in the diluted phase have a higher (more negative) chemical potential than the molecules in the concentrated phase. This chemical disequilibrium causes a flow of solution molecules (water) from the less concentrated phase to the more concentrated phase. This flow continues until osmotic equilibrium has been achieved and $$\mu_{i,1} = \mu_{i,2} \qquad (3)$$

All the parameters in the expression for the chemical potential (equations 1 and 2 above) can be changed, for example the temperature, concentration and pressure. In other words, with reference to a water/salt solution, the water will rapidly move to the more concentrated side to dilute the solution, while the salt will rapidly try to move in the other direction to try to increase the concentration. The transportation of salt will only take place if the membrane is not a perfectly semi-permeable membrane. By combining the equations (1), (2) and (3), we get the following:

$$RT(lna_{i,2} - lna_{i,1}) = (P_1 - P_2)V_i = \Delta\pi V_i \qquad (4)$$

The hydrodynamic pressure difference $(P_1-P_2)$ is called the osmotic pressure difference $\Delta\pi = \pi_1 - \pi_2$. If only a pure solution (water) is used in phase 2 ($a_{1,2}=1$ in chamber 4), the equation (4), the pressure, becomes:

$$\pi - \frac{RT}{V_i} lna_{i,1}$$

Figure 2:
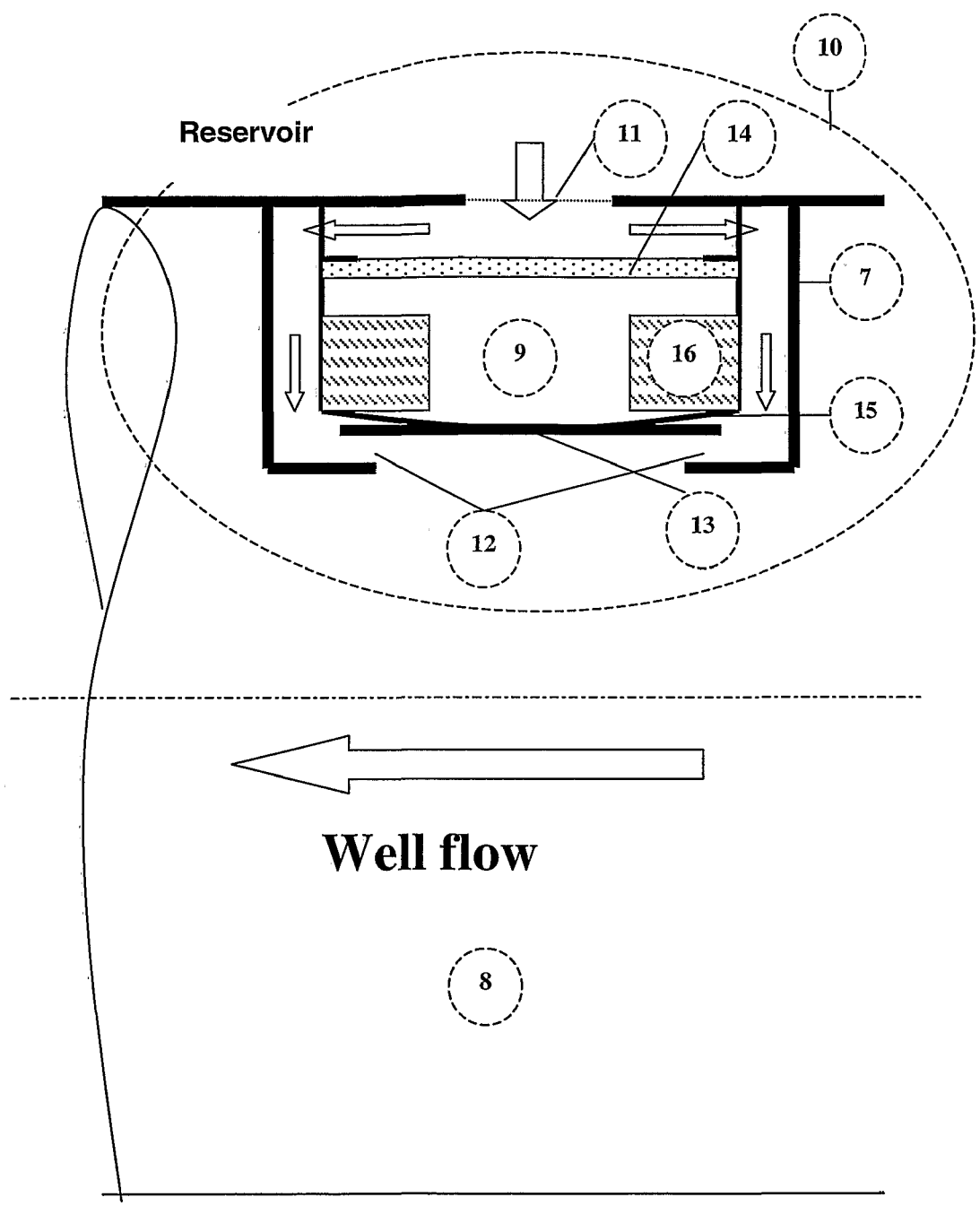
FIG. 2 shows a schematic diagram of a solution in which an actuator in accordance with the present invention is used in connection with an inflow restriction device or valve device in a drainage pipe for the extraction of oil and gas from formations (a well) under the surface of the earth.

As stated above, FIG. 2 shows a schematic diagram of a solution in which an actuator 10 in accordance with the present invention is used in connection with a drainage pipe 8 for the extraction of oil and gas from formations (a well, not shown) under the surface of the earth. In the example shown here, the actuator is an integrated part of a valve or inflow restriction device in the drainage pipe.

As shown in FIG. 2, the actuator 10 consists of a housing 7 with an internal osmosis cell 9. The housing 7, with the cell 9, is located inside and is fastened to the pipe 8 right opposite a hole 11. Oil, gas and/or water are designed to flow from the formation into the pipe 8 via the hole 11, past the cell 9 and on via openings or holes 12 in the housing, past a shutdown plate or similar structure 13 and into the pipe 8. The cell 9 consists, in turn, of a hollow body or chamber of which the end side facing the pipe wall of the pipe 8 consists of a semi-permeable membrane 14, while the wall on the opposite side consists of a flexible, impermeable membrane 15. The shutdown plate 13, which is located opposite the holes 12, is fastened to the flexible membrane 15. Inside the cavity, the cell 9 is provided with a water/salt solution, and salt blocks 16 are provided in order to keep the solution saturated at all times.

The actuator with the cell 9 works as follows. When only oil and/or gas flow past the membrane 14, the flexible membrane 15 with the shutdown plate 13 will be pressed in and the fluid will be able to pass between the holes 12 and the shutdown plate (open). When water begins to flow past the membrane with the oil/gas, the water will gradually pass through the membrane 14 into the chamber, causing the volume of the solution inside the chamber to increase and the flexible membrane 15 with the plate 13 to move outwards and gradually shut down the flow through the holes 12. If there is a lot of water, for example in the event of water coning, as mentioned above in the background of the invention, the flexible membrane with the plate will move fully out and completely shut down through-flow. In this way, the actuator in accordance with the present invention can be used to regulate the inflow of oil and/or gas partially or fully, depending on the quantity of accompanying water.

Please note that the present invention as it is defined in the attached claims is not limited to the example shown above. For example, a cylinder/piston device in which the piston moves the shutdown plate may be used instead of a flexible membrane. Or a needle/nozzle solution in which the needle is moved by a flexible membrane or piston may be used instead of a hole/plate solution 12, 13.

Nor is the present invention limited to use in connection with the extraction of oil and/or gas as described above. It may be used in any situation in which there are liquids or solutions where the osmosis principle can be used.

Otherwise, the present invention may be used to advantage in connection with an inflow restriction device as shown in the applicant's own EP patent no. 0 588 421.

The invention claimed is:

1. A method of operating an actuator placed in a fluid flow or a fluid reservoir, the method comprising:
   providing the actuator with an osmotic cell containing a solution; and
   placing the actuator adjacent a wall of a drainage pipe for the production of oil or gas, or oil and gas, so that the osmotic cell is placed in the fluid flow or the fluid reservoir, thereby operating the actuator so that the actuator provides force and motion for driving or adjusting a valve or inflow control device, wherein the force and motion are achieved by utilizing an osmotic pressure difference between the solution in the osmotic cell and the fluid flow or fluid reservoir.

2. The method in accordance with claim 1, wherein the solution in the osmotic cell is a water and salt solution.

3. The method in accordance with claim 2, wherein the actuator is used to operate a valve that regulates the inflow of fluid through inflow openings in the drainage pipe.

4. The method in accordance with claim 1, wherein the motion and force of the actuator are used to operate a valve that regulates the inflow of fluid through inflow openings in the drainage pipe.

5. An actuator device for controlling a fluid flow, the actuator device being adapted to be used with a drainage pipe for production of oil and/or gas in a reservoir, and the actuator device is an integrated part of a valve or an inflow control device, the actuator device comprising:
   an osmotic cell provided with a solution, the osmotic cell being arranged in a housing that is fastened to an interior wall of the drainage pipe in connection with an inlet hole in the pipe wall,
   wherein the osmotic cell is designed to be placed in an external fluid flow or fluid reservoir such that force and motion of the actuator device are achieved for driving or adjusting a valve or inflow control device by utilizing an osmotic pressure difference between the solution in the osmotic cell and the external fluid flow or fluid reservoir,
   wherein fluid from outside the drainage pipe is designed to flow through the inlet hole, on through the housing and out through at least one outlet opening in the housing, and a valve plate is designed to close or open the at least one outlet opening by means of the osmotic cell.

6. The actuator device in accordance with claim 5, wherein the solution in the osmotic cell is a water and salt solution.

7. The actuator device in accordance with claim 6, wherein the osmotic cell further comprises salt blocks provided inside the housing.

8. The actuator device in accordance with claim 5, wherein the osmotic cell includes a flexible membrane that makes up all or part of one wall of the osmotic cell, the flexible member being connected to the valve plate so that the valve plate can be moved by the flexible member.

9. The actuator device in accordance with claim 8, wherein salt blocks are provided inside the osmotic cell.

10. The actuator device in accordance with claim 5, wherein the valve plate is designed to be moved by a piston and the osmotic cell comprises a piston/cylinder arrangement in which one wall is designed as a moving piston in the housing.

11. The actuator device in accordance with claim 10, wherein salt blocks are provided inside the osmotic cell.

12. The actuator device in accordance with claim 5, wherein salt blocks are provided inside the osmotic cell.

13. A method of operating a valve or an inflow control device to regulate flow of fluid through a drainage pipe disposed in the vicinity of a fluid flow, the method comprising:

placing an actuator at an opening formed through a wall of the drainage pipe to receive the fluid flow or the fluid flow from the fluid reservoir, wherein the actuator has a plate and an osmotic cell connected to the plate via a flexible member; and operating the valve or the inflow control device in response to the fluid flow through the opening in the wall of the drainage pipe, wherein the actuator is positioned so that the osmotic cell is placed in the fluid flow to cause movement of the plate via the flexible member due to an osmotic pressure difference between a solution in the osmotic cell and the fluid flow or the fluid flow from the fluid reservoir.

\* \* \* \* \*